Figure 1:
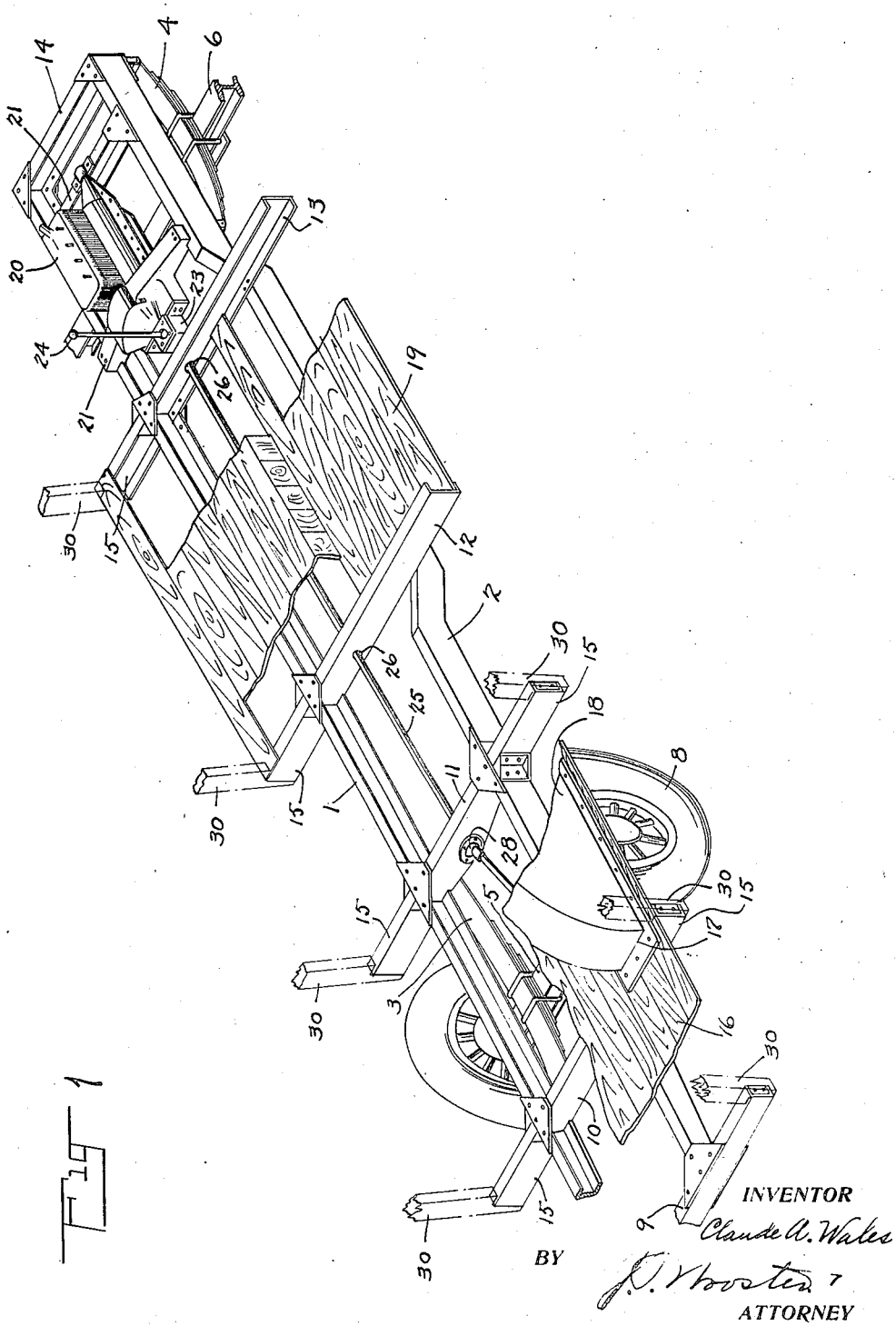

Nov. 27, 1923.

C. A. WALES

VEHICLE FRAME

Filed Nov. 19, 1921

1,475,332

2 Sheets—Sheet 1

INVENTOR
Claude A. Wales
BY
J. Wooster
ATTORNEY

Nov. 27, 1923.
C. A. WALES
VEHICLE FRAME
Filed Nov. 19, 1921
1,475,332
2 Sheets-Sheet 2
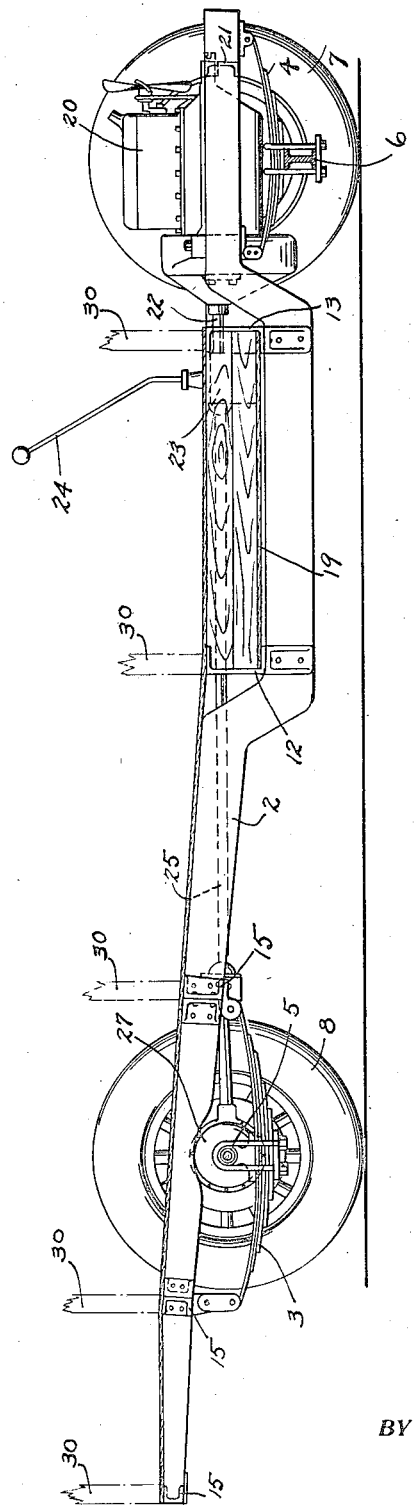
INVENTOR
Claude A. Wales
BY
ATTORNEY Patented Nov. 27, 1923.

1,475,332

UNITED STATES PATENT OFFICE.

CLAUDE A. WALES, OF BROOKLYN, NEW YORK, ASSIGNOR TO THE PASSENGER LORRY COMPANY, A CORPORATION OF DELAWARE.

VEHICLE FRAME.

Application filed November 19, 1921. Serial No. 516,277.

*To all whom it may concern:*

Be it known that I, CLAUDE A. WALES, a citizen of the United States, and resident of Brooklyn, in the county of Kings and State of New York, have invented certain new and useful Improvements in Vehicle Frames, of which the following is a specification.

This invention relates to vehicle frames, particularly to the frames of lorries or busses for the transportation of passengers and freight, wherein a special construction of frame is desirable in order to enable the passengers to enter and leave without an objectionable number of steps up and down, and also enabling the entrance and exit of the passengers to be under the direct observation and control of the driver. For freight similar conditions apply in order to save time at stops.

In dealing with the problems of safely, quickly and economically handling passengers with busses operated by one man who may have to collect fares, make change, operate doors, and answer questions, besides taking on and letting off passengers, watching other traffic, and controlling his motor, speed, and brakes, it is found that unnecessary and expensive delays occur where there are several steps to be negotiated between the ground and the car floor. It is further found that a momentary crowding of passengers within the car on an intermediate loading platform is unobjectionable, provided that they do not interfere with the controls and doors, where the latter are used. It is further found that even with the lowest practicable forms of motor vehicle spring suspensions, intended to lower present frames, several steps are necessary between the floor and the ground, as motor vehicle interior frames have to be of considerable depth to obtain light weight and cannot be dropped sufficiently to eliminate a step and still retain the necessary road clearance, unless made shallow and excessively heavy.

I have therefore devised a light motor vehicle frame especially intended for passenger vehicles, which can be hung as low as the necessary clearance permits on any desired form of spring suspension, and recessed on one side to provide a support for an intermediate depressed entrance platform inside the outside line of the body, constituting a pit. This platform is preferably opposite the driver's side, is of dimensions to hold several standing passengers at once, and can be practically in the lowest clearance plane of the chassis, or an easy step above the ground.

With these and other objects in view I have devised the apparatus embodying the invention as described in the following specification and shown in the accompanying drawings of which Figure 1 is a perspective view and Figure 2 is a side elevation of a vehicle frame similar in all respects to that shown in Figure 1 except for a different mode of rear suspension, and location of transmission gears.

Referring to the drawing, the frame consists of longitudinal members 1 and 2 extending the greater part of the length of the frame supported on rear springs 3 and forward springs 4; Figure 1 shows an overslung mounting whereby rear springs 3 are mounted above rear axle 5, while Figure 2 discloses an under-slung mounting whereby rear springs 3 are mounted below rear axle 5; forward springs 4 are mounted in the usual way upon forward dead axle 6; forward wheels 7 and rear wheels 8 are mounted in the usual way upon their respective axles 6 and 5; longitudinal members 1 and 2 are connected together by cross members 9, 10, 11, 12, 13 and 14, of which cross members 9 and 14 are positioned respectively at the rear and forward ends of the frame, the other cross members being distributed at suitable intervals along the length of the frame. Longitudinal members 1 and 2 are spaced substantially closer together than the designed wheel tread, as is usual in motor vehicle frames, and carry outwardly extending members 15 which are disposed upon either side of the frame and in alignment with the aforesaid cross members to provide support for an over-hanging floor 16, the latter being cut away as at 17 to provide space for rear wheels 8. Wheels 8 are enclosed in wheel guards 18 which are mounted over openings 17 on floor 16. The intermediate portion of longitudinal member 2 is downwardly deflected or depressed substantially one easy step below the floor and below the level of the corresponding portion of longitudinal member 1, to constitute a pit space, said longitudinal member 1 being elsewhere parallel with member 2.

Cross members 12 and 13 disposed at the rear and forward ends respectively of said depressed portion, extend at least to or beyond the wheel tread, and consist of straight channel members having a depth equal to the depth of the depression with their upper flanges in the plane of the upper surface of longitudinal member 1 and with their lower flanges resting directly upon the depressed portion of longitudinal member 2. Cross members 12 and 13 thus provide a brace for longitudinal member 2 at the two offsets in said member and they also provide a support for a depressed entrance platform 19 in said pit space which rests upon the depressed portion of member 2 and on the lower flanges of channels 12 and 13. Floor 16 rests upon longitudinal members 1 and 2, cross members 9, 10, 11, 12, 13 and extensions 15, but is cut away upon one side of the vehicle between cross members 12 and 13 to provide for entrance platform 19 which is about one step below the level of said floor and within an easy step of the ground. The engine support is in the forward portion where the power plant consists of the usual internal combustion engine 20 mounted on cross pieces 21 forming an engine support in the forward portion of the chassis, the power shaft 22 of which is connected to the usual selective speed and reversing gear device 23 having control handle 24. Propeller shaft 25, driven from transmission device 23 passes through openings 26 in cross members 13, 12 and 11 and drives rear wheels 8 through the usual differential and rear axle assembly 27. A universal joint 28 is provided between the opening 26 in cross member 11 and rear axle assembly 27. The transmission gears 23 may be positioned forward of cross member 13 or they may be positioned between cross members 12 and 13. In the latter case the inner edge of platform 19 will terminate short of the housing of transmission gears 23 and floor 16 will extend sufficiently far to cover the same, and in either case propeller shaft 25 will be protected by floor 16. Thus it will be seen that platform 19 may extend inward substantially to the center line of the vehicle and the adjacent portion of floor 16 affords a convenient location for the driver's seat. The outer ends of extension 15 may be connected by light frame members where suitable. Body uprights 30 are carried upon the outer ends of extensions 29.

What I claim is:

1. A vehicle frame comprising in combination a pair of longitudinal members, one being downwardly depressed an easy step below the opposite portion of the other member, and a cross bracing member attached to said longitudinal members and extending from one across and over the depressed portion of the other longitudinal member.

2. A vehicle frame comprising in combination a pair of longitudinal members, one of them being intermediately downwardly depressed an easy step below the opposite portion of the other, and a pair of cross members attached to said longitudinal members adjacent the ends of said depressed portion and extending from one across and over the depressed portion of the other longitudinal member.

3. A motor vehicle frame comprising in combination a pair of longitudinal members spaced substantially closer than the designed wheel tread, one being intermediately downwardly depressed an easy step below the opposite portion of the other, and cross members attached to said longitudinal members extending over and beyond said depressed member to at least the designed wheel tread.

4. A motor vehicle chassis comprising in combination a pair of longitudinal members extending the greater part of the length of the chassis, one being downwardly depressed adjacent the forward portion of the chassis to provide an entrance pit within an easy step of the ground and extending from outside the depressed member inwardly to adjacent the center of the chassis, the opposite portion of the other longitudinal member being an easy step above the depressed part of the first mentioned longitudinal member, a cross bracing member attached to said longitudinal members and extending from one across and over the depressed portion of the other, a floor carried by said cross member and depressed member to constitute an entrance platform in said pit, and a floor carried by said longitudinal members an easy step above said entrance platform.

5. A motor vehicle frame comprising a pair of oppositely disposed longitudinal members in the same horizontal plane except for an intermediate portion of one of said members being depressed below the level of the corresponding portion of the other member, and cross members connecting said longitudinal members at both elevated and depressed portions, the latter cross members being straight and disposed in the plane of the undepressed member and resting upon the depressed member.

6. A motor vehicle frame comprising a pair of oppositely disposed longitudinal members in the same horizontal plane except for an intermediate portion of one of said members being depressed below the level of the corresponding portion of the other member, and cross members connecting said longitudinal members at both elevated and depressed portions, the latter cross members consisting of straight channels equal in depth to the depth of the depression and having their lower flanges resting upon the depressed member and their upper flanges disone of said series of loop warp threads and a rib stitching portion on said loosely knitted portion comprising a series of loop warp thread having a plurality of strands and interlocking said operative series of loop warp threads provided for the loosely knitted portion substantially as described.

3. In a piece of knitted goods, a taffeta stitching comprising a series of loop warp threads, passing approximately diagonally back and forth widthwise of the fabric, and another series of loop warp threads likewise passing approximately diagonally back and forth widthwise of the fabric and interlocking with said first mentioned series at its opposite travel, a loosely knitted portion comprising a series of loop warp threads, and passing diagonally back and forth widthwise of the fabric, said series being a continuation of one of the above-mentioned series, and a rib stitching comprising a plurality of contiguous consecutive threads having a plurality of strands passing diagonally back and forth widthwise of the fabric and interlocking the oppositely disposed series of looped warp threads in the loosely knit portion.

4. In a piece of knitted goods, a taffeta stitching comprising a series of loop warp threads passing approximately diagonally back and forth widthwise of the fabric, and another series of loop warp threads likewise passing approximately diagonally back and forth widthwise of the fabric, the distance of travel of this series of loop warp thread being greater than the distance of travel of the first mentioned series.

5. In a piece of knitted goods, a taffeta stitching comprising a series of loop warp threads passing approximately diagonally back and forth widthwise of the fabric, and another series of loop warp threads likewise passing approximately diagonally back and forth widthwise of the fabric and interlocking with said first mentioned series at its opposite travel, a loosely knitted portion comprising a series of loop warp threads, and passing diagonally back and forth widthwise of the fabric, said series being a continuation of one of the above-mentioned series, and a rib stitching comprising a plurality of contiguous consecutive threads having a plurality of strands passing diagonally back and forth widthwise of the fabric and interlocking the oppositely disposed series of looped warp threads in the loosely knit portion and disposed adjacent to the first mentioned series at a distance greater than the distance between two consecutive threads.

In testimony whereof I affix my signature.

EDWARD C. WARD.